United States Patent

[11] 3,540,507

| [72] | Inventors | Etheridge R. McClelland<br>Hayward;<br>Henry L. Spence, Dublin, California |
|------|-----------|---|
| [21] | Appl. No. | 713,823 |
| [22] | Filed | March 18, 1968 |
| [45] | Patented | Nov. 17, 1970 |
| [73] | Assignee | Filper Corporation<br>San Ramon, California<br>a corporation of California |

[54] DRUPE PITTER
19 Claims, 8 Drawing Figs.

| [52] | U.S. Cl. | 146/237,<br>146/28 |
|------|----------|--------------------|
| [51] | Int. Cl. | A23n 3/00 |
| [50] | Field of Search | 146/28.1,<br>237, 238 |

[56] References Cited
UNITED STATES PATENTS

| 2,880,774 | 4/1959 | Perrelli | 146/28 |
| 3,010,501 | 11/1961 | Anderson | 146/238 |
| 3,113,602 | 12/1963 | Perrelli | 146/238 |

*Primary Examiner*—W. Graydon Abercrombie
*Attorney*—Boyken, Mohler, Foster & Schwab ABSTRACT: A drupe pitter for pitting drupe halves having half or whole pits therein, including a face plate against which the cut face of the half is positioned and held, and pit engaging means adapted to enter the body of the drupe half through said cut face outwardly of the pit, and to tightly engage the side of the pit within the drupe half in a direction generally toward the plane of said cut face, and thereafter to rotate about the pit within the drupe half to remove the pit and any fragments thereof and to clean the pit cavity.

INVENTORS
ETHERIDGE R. MCCLELLAND
HENRY L. SPENCE

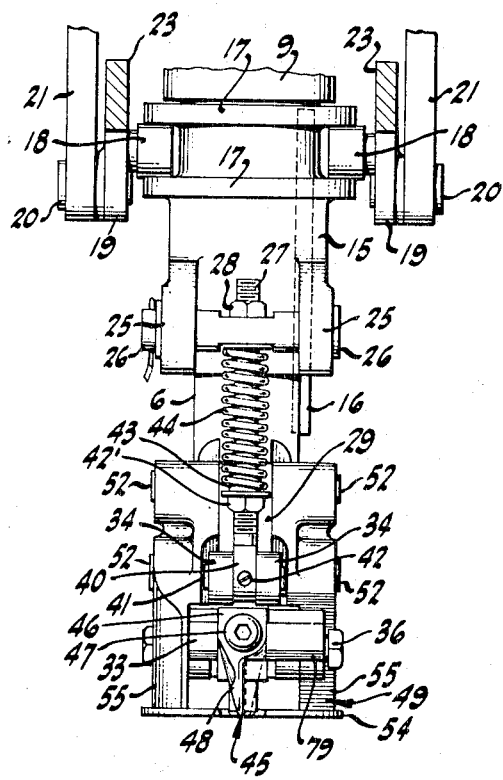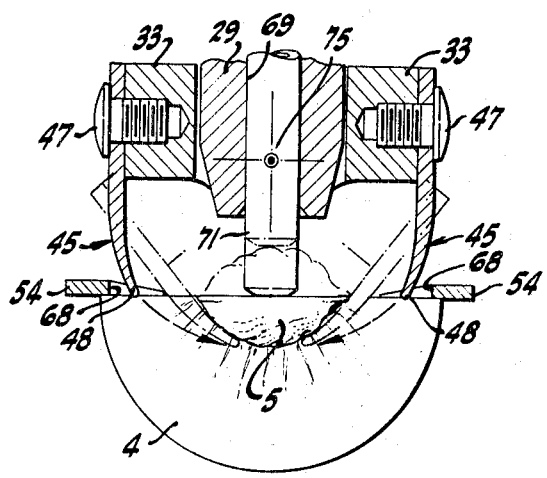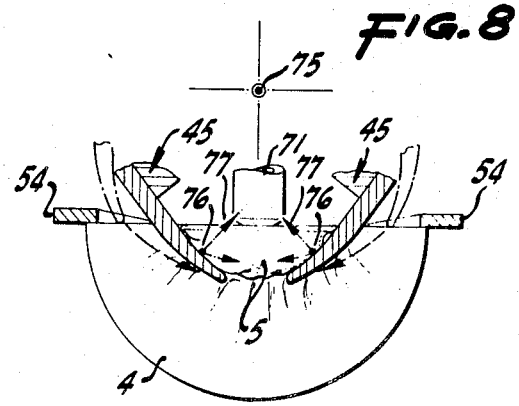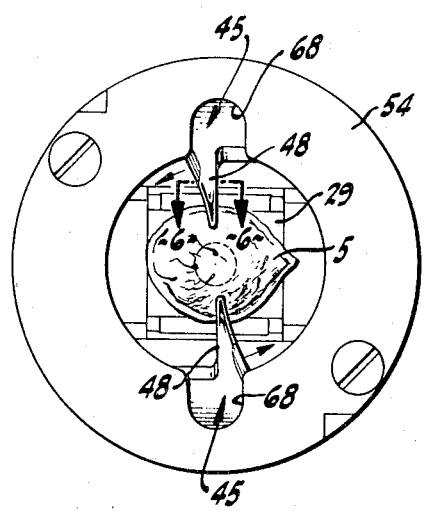

INVENTORS
ETHERIDGE R. MC CLELLAND
HENRY L. SPENCE

BY

ATTORNEYS 3,540,507

DRUPE PITTER

BACKGROUND OF INVENTION

The results obtained from the torque-type pitting system in which whole drupes, such as clingstone peaches, are bisected around the pit by bisecting blades, and the pit is then held between the bisecting blades while drupe engaging means engage the convex outer surfaces of the generally hemispherical halves, and rotate the halves relative to the pits to shear the halves from the pits are well known. However, due to certain unfavorable climatic conditions during the development of peaches, the pits therein may separate or become so weakened in the planes of their sutures that the bodies and pits of the fruit will both be bisected, leaving a pit half in each half of the body.

The same unfavorable climatic conditions may also account for such weaknesses in the pit halves that the latter will readily break if they are gripped between opposed gripping elements that engage the edges of the whole or half pits and fragments will not be removed from the pit cavities. Also, in many instances, impaired and objectionably colored meat of the halves around the pit, particularly along the plane of the suture, is undesirable.

By the present invention, the pit or pit half, as the case may be, is engaged by means thrust into the body, and spaced from the edges of the pit, in a manner to apply a yieldable force against the pit in a direction toward the plane of the cut face, or outwardly of the drupe half, and at the same time the opposite side of the pit is engaged by a member that is yieldably held at the said plane. The fibers holding the pit within the pit cavity are then progressively separated and weakened by moving the aforesaid means in a generally annular path relative to the body of fruit while maintaining its yieldable force, whereby the pit will be separated from the body of the half and the pit cavity will be cleaned.

By the present invention and method, the appearance of the fruit halves after pitting is substantially the same as where the pitting has been effected by the torque-pitting method.

This invention is not concerned with the manner in which the drupes are bisected, and it operates with equal efficiency whether a whole or a half pit is in a drupe half, hence it is applicable as a repitter for drupes that may have failed to be pitted by a torque pitter or as an original pitter where the drupes and pits have been intentionally bisected.

DESCRIPTION OF DRAWINGS

In the drawings, FIG. 2 is a view of the pitter head of FIG. 1 as seen from line 2–2 of FIG. 1.

FIG. 3 is a bottom plan view of the lower end of the pitting head of FIG. 1.

FIG. 6 is an enlarged fragmentary cross-sectional view along line 6–6 of FIG. 3.

FIG. 7 is a fragmentary cross-sectional view through a drupe half showing the pit engaging elements in full line, engaging a pit half, and in dot-dash lines engaging a whole pit in a drupe half.

FIG. 8 is a semidiagrammatic view similar to FIG. 7, illustrating the direction of pressure or force applied to the pit when the latter is engaged by the pit removing elements.

DETAILED DESCRIPTION

Figure 1:
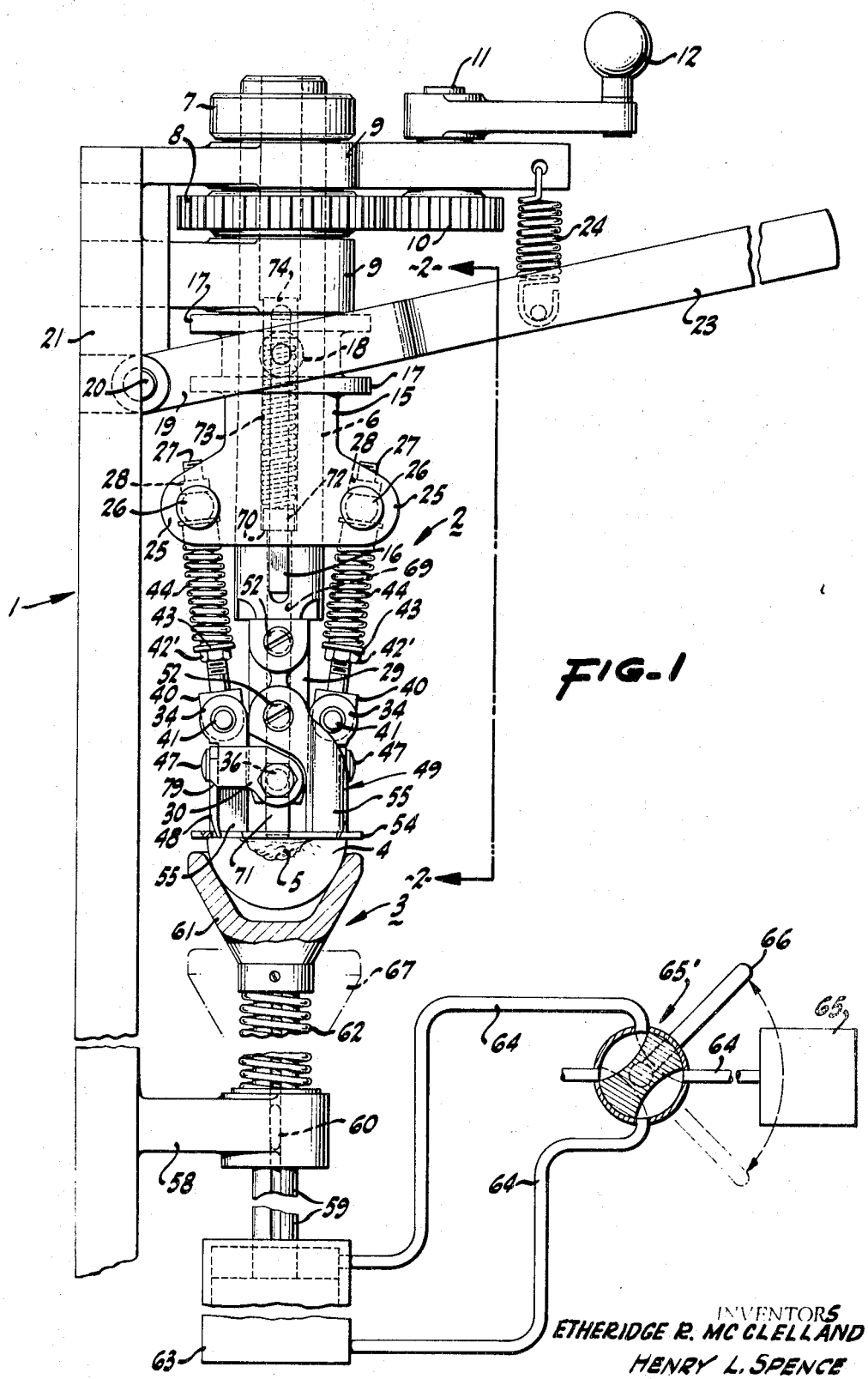
FIG. 1 is a side elevational view of a simple pitter head and drupe holder in cross section, including means for actuating them, the drupe holder being broken in vertical length.

Any suitable rigid support, generally designated 1 is provided for supporting the pitting head, which is generally designated 2, and the drupe holder generally designated 3, is supported for vertical reciprocable movement for presenting a drupe half 4, with its cut face directed upwardly, to the lower end of the pitting head 2 for removal of the pit 5 adhered to the drupe half 4 within the pit cavity of the latter.

The pitting head itself comprises a vertically disposed shaft 6 stationarily supported at its upper end for rotation only about its vertical axis, but held against axial movement by a collar 7 secured on the upper end of said shaft above support 1. A gear 8 is secured on the upper end of shaft 6 between portions 9 of support 1, and through which portions shaft 6 rotatably extends. A pinion 10, having its teeth in mesh with the teeth of gear 8 is secured to a shaft 11 that is also rotatably supported on said support and a handle 12 connected with said shaft is actuatable for rotating the pinion 10 and gear 7, and, consequently shaft 6.

A sleeve 15 below the gear 8 is vertically reciprocable on shaft 6 while a spline 16 secures the shaft and sleeve 15 together for rotation as a unit.

The upper end of sleeve 15 is formed to provide a radially outwardly opening channel having upper and lower walls 17. Coaxial rollers 18 are disposed in said channel between said walls at opposite sides of said sleeve, which rollers are respectively supported for rotation about their axis on fork arms 19. One of the corresponding outer ends of said fork arms are connected by pivots 20 with portions 21 of the stationary support 1 at one side of sleeve 15, while their opposite ends are connected with a handle 23 for vertically reciprocating sleeve 15 upon vertically oscillating said handle. A spring 24 may connect handle 23 with an overhead portion of support 1 for yieldably holding sleeve 15 at the upper end of its stroke.

The lower end of sleeve 15 is formed with a pair of horizontally spaced, opposed ears 25 (FIGS. 1, 2) projecting laterally outwardly from opposite sides of said sleeve. A horizontal shaft 26 is rotatably supported at its ends in openings formed in the ears 25 of each pair. A generally vertically extending rod 27 reciprocably extends at its upper end through an opening intermediate the ends of each shaft 26, and a nut 28 on the upper end of each rod above shaft 26 limits downward movement of the rod relative to shaft 26.

Figure 4:
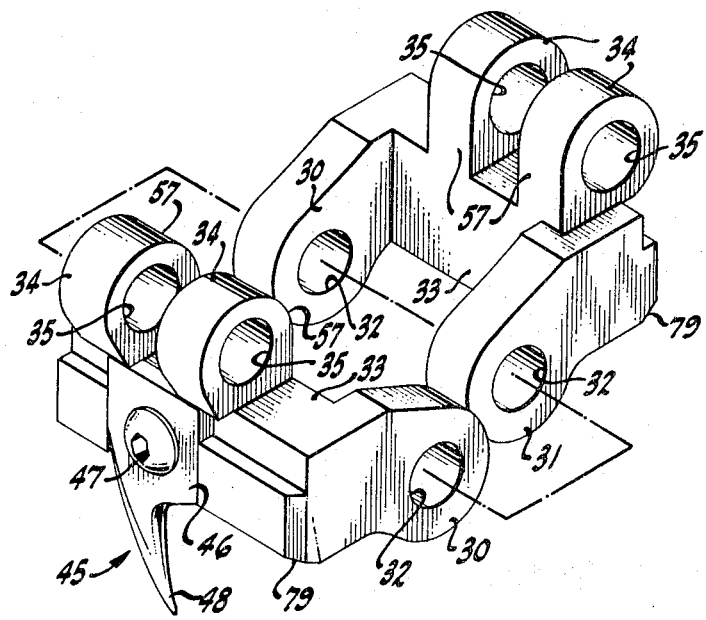
FIG. 4 is an exploded view of the two elements carrying the pit engaging means.

The lower end portion 29 of the central vertical shaft 6 is rectangular in cross-sectional contour (FIGS. 2, 3), and the pit-engaging elements, to be later described in detail, are carried on the lower end of the portion 29 by means shown separate from said lower end portion 29 in FIG. 4, comprising two pairs of opposed arms 30, 31, each pair having coaxial openings 32 integral with and projecting laterally from the opposite ends of a pair of horizontally elongated blocks 33. A pair of horizontally opposed, spaced lugs 34 having coaxial openings 35 therein are integral with and project upwardly from the upper sides of each of said blocks 33.

The arms 30, 31 of the pair thereof on one of the blocks 33 are in lapping relation to arms 30, 31 on the other block with openings 32 in all of the arms in axial alignment when the arms and blocks 33 are on the pitting head. As seen in FIG. 4, one of the arms 30 is outermost of one arm 31 relative to the center of blocks 33, and the other arm 30 is innermost, while lugs 34 of the two pairs are directly opposite to each other and are positioned centrally between the outermost dimension of the pairs of arms 30, 31 when said arms are in assembled relation (FIG. 2). Coaxial pivots 36 extend through each adjacent arms 30, 31 and said pivots are threaded into openings in opposite sides of the lower end portion 29 of shaft 6.

Referring back to the vertically extending rods 27 that reciprocably extend at their upper ends through shafts 26, each of said rods is secured to a block 40 at its lower end, one of which blocks being positioned between the pair of lugs 34 that are at each of the opposite sides of the pitting head (FIGS. 1, 2) and a pivot 41 extends through each block and into the openings in lugs 34. A setscrew 42 secures each pivot to each block 40.

The lower end portion of each rod 27 is threaded, and a nut 42′ thereon supports a flanged collar 43 on its upper side. An expansion coil spring 44 around each rod 27 reacts between the flange of each collar 43 and a flange on a similar collar positioned against shaft 26. The nut 28 on the upper end of each rod 27 above shaft 26 limits the downward movement of said rod under the influence of spring 44.

From the foregoing structure it is seen that the lugs 34 and arms 30, 31 on each block 33 provide a crank which, upon downward movement of the sleeve 15 from its uppermost position in which the lugs project upwardly, will rotate the blocks 33 about the axis of pivots 36. As viewed in FIG. 1, the left-hand pair of lugs 34, and consequently the left-hand block 33, will rotate counterclockwise, while the right-hand pair of lugs 34, and the right-hand block 33 will rotate clockwise.

The lugs 34 project at their lower ends slightly outwardly of the blocks 33 relative to the axis of the shaft 6, and directly below and against the projecting portion of each pair of lugs (when said lugs are in their uppermost position) is a pit-engaging element, generally designated 45, each of which has a wide upper portion 46 (FIGS. 2, 4) removably secured against the outer side of each block, relative to the aforesaid axis, by a screw 47. Portion 46 of each element 45 is seated in a recess formed in said outer side of each block to preclude any movement of the pit-engaging element relative to the block when the screw 47 is tightened.

Depending from the upper portion of 46 of each pit-engaging element is a single tine or prong 48, which is the pit-engaging portion of the element 45, as will be described more in detail later on.

Figure 5:
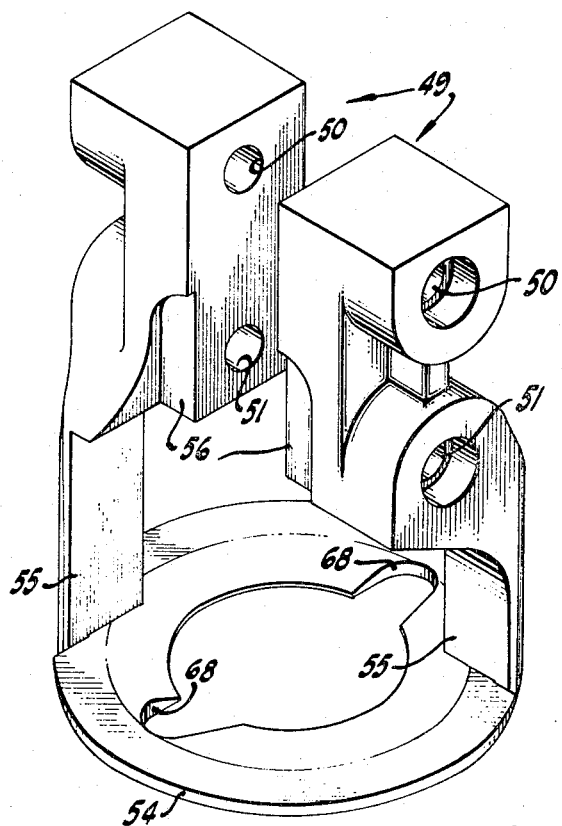
FIG. 5 is a perspective view of the ring support for supporting the annular plate against which the cut face of a drupe half is positioned for pitting.

Rigidly secured to the lower end portion 29 of shaft 6 adjacent to and above the pairs of arms 30, 31 at the ends of block 33, and against the same sides of said portion 29 as face said blocks, are the upper ends of a pair of vertically extending ring supports 49 (FIG. 5). Said pair of supports are formed with coaxial upper openings 50 and coaxial lower openings 51 for upper and lower bolts 52 (FIG. 1) that are respectively threadedly secured in openings in said lower end portion 29 of shaft 6 for securely bolting said ring supports to said lower portion.

A horizontal ring 54 is secured to, and below the lower ends of a pair of oppositely positioned downward extensions 55 of said ring supports 49 (FIGS. 2, 5). Ring 54 is in a horizontal plane perpendicular to the axis of shaft 6, and its lower surface is at the level of the terminal lower ends of the tines 48.

Said downward extensions 55, while diametrically opposite to each other on ring 54, are offset circumferentially of the ring to opposite sides of a vertical plane in which the pair of tines 45 are disposed, so as to clear the outermost arms 30, 31 (FIG. 1) respectively at opposite sides of the lower end portion 29 of shaft 6.

The vertical surfaces 56 (FIG. 5) on opposite sides of each of the supports 49 are adapted to be engaged by the surfaces 57 (FIG. 4) on lugs 34 when said lugs are in their uppermost positions and when the lower ends of the tines 48 are retracted upwardly at the upper ends of their movements.

A bracket 58, rigid on the support 1, may project laterally to below ring 54 for supporting a vertical post 59 for vertical reciprocable movement. Said post may be square or the bracket may carry a spline 60 that extends into a vertical groove in a side of the post to prevent rotation of said post about its axis.

An upwardly opening drupe holding cup 61, having convergently downwardly tapered ribbed sides is adapted to be secured to the upper end of said post 59, said shaft and cup being coaxial with each other and with the vertical axis of shaft 6, and a spring 62 may react between the cup and a stationary bearing through which the shaft is reciprocable.

The lower end of post 59 may have a piston or plunger at its lower end within a vertically disposed, double acting air cylinder 63 connected by air pressure lines 64 with any suitable source 65 of compressed air. A valve 65' in said lines between said source and said cylinder may include valve actuating means 66 for alternately admitting and exhausting air from opposite sides of such plunger for vertically reciprocating the post and cup 61. When the cup is in a lowermost position 67 (dotted lines in FIG. 1), a half drupe 4 with its cut face directed upwardly may be readily positioned in said cup. The latter is of a size to support different sized drupes, but in each instance the cut face is in a horizontal plane spaced above the plane in which the upper edges of the cup are positioned. When compressed air is admitted into the lower end of the cylinder 63 the cup and drupe half are moved upwardly and the cut face of the drupe is held tightly against the lower surface of ring 54 with the drupe pit 5 exposed through and spaced from the central opening in ring 54.

The inside and outside diameters of said ring 54 are such that the cut face of the drupe will have substantial engagement therewith and the inner edges of the ring will be spaced from the pit, but at two substantially diametrically opposite sides of said ring its inner periphery is formed with recesses 68 (FIG. 5) into which the lower end portions of the tines 48 are retracted.

The shaft 6 including its downward extension 29 is formed with a central open ended bore 69, the upper portion being slightly larger in diameter than the lower portion, (FIG. 1), thus providing an upwardly facing shoulder 70 at a point intermediate the ends of the bore, and a vertical rod 71 is reciprocable within the lower portion of said bore, said rod having a head 72 in the upper enlarged portion of the bore that engages shoulder 70 when the rod is in its lowermost position, the lower terminal end of the rod is at the same horizontal plane as the lower surface of ring 54, and said lower end would be substantially centrally of a pit 5 in a drupe half in cup 61.

An expansion spring 73 reacts between head 72 on rod 71 and a threaded stop member 74 threadedly secured in the upper end of the enlarged upper end of bore 69 for yieldably urging rod 71 to its lower position and for yieldably resisting upward movement. This stop member 74 being adjustable longitudinally of bore 69 enables adjustment of the tension of spring 73 and the resistance required to elevate the rod.

When cup or holder 60 is elevated to hold the cut face of a drupe half against the lower surface of ring 54, the lowering of sleeve 15 will rotate the crank means, comprising block 33, arms 30, 31 and lugs 34, to cause the tines 48 to move downwardly into the body of the half-drupe 4 at opposite sides of the pit 5, and then toward each other to positions below and in engagement with the lower side of pit 5 (FIG. 6) about the common axis 75 (FIGS. 7, 8) of pivots 36.

The tines 48 are relatively long and are closely adjacent, but at opposite sides of a vertical plane bisecting shaft 6 (FIG. 2) so that, in the case of a small pit, the outer ends of the tines may cross, or extend past each other at their outer ends.

Said tines are relatively straight, although their outer end portions may be slightly curved toward each other with the convex sides generally facing the pit. By this structure of the tines and the position of pivots 36 relative to the outer ends of the tines, including the position of the tines adjacent to the opposite edges of the drupe pit, the terminal outer ends of the tines will not dig into the pit, but the adjacent sides of the tines adjacent to the terminal ends will slidably engage the lower surfaces of the pit at or adjacent to points 76 (FIG. 7) and upon such engagement, and progressive added downward movement of the sleeve 15, a yieldable upward pressure of the tines 48 against the pit generally in the direction of lines 77 (FIG. 7) will occur, which pressure is yieldable due to springs 44, and this degree of pressure can be adjusted by adjusting the nuts 42' to increase or decrease the tension of said springs.

The tines 48 are generally wedge shape in cross-sectional contour (FIG. 6) and the leading edge 78 is preferably slightly rounded and relatively narrow with with the opposite sides also slightly rounded extending away from said leading edge to the trailing edge. By this structure, when the tines are thrust into the drupe half as seen in FIGS. 7, 8, and the sleeve 15 and shaft 6 are rotated by actuation of the actuating means 8, 10 and 12, so that the leading edges will move in an annular path below the pit, there will be a constant upward pressure on the pit by the tines and the fibers connecting the pit and the flesh of the drupe half will be progressively broken by the tines and by spreading action of the tines, and by the upward pressure of the tines against the pit until the pit is freed, and at the same time the portions of the tines extending across the edges of the pit will clean the pit cavity around said edges.

Also, by the foregoing structure, where a pit is fragmented or broken, as occurs in some cases, the fragments will normally be cleaned out of the pit cavity instead of being imbedded in the flesh.

The central rod 71 is adapted to approximately centrally engage a half-pit to maintain it against the tines during rotation of the latter, and in the event a whole pit should be in the drupe half, it will yield to accommodate such pit.

The lower surfaces 79 (FIG. 4) of the block 33 are adapted to engage the upper surface of ring 54 to limit the downward and lateral movement of tines 48.

The present invention must be distinguished from the method in which the opposite edges of the pits are engaged and a compressive force is applied at said edges against the portion of the pit between the said edges. In the present instance the edges of the pit are not engaged by the tines to grip the pit, but a twisting force on the pit, relative to the flesh at the pit cavity, is clearly applied during sliding of the tines over the roughened convex surface of the pit during the movement of the tines in an annular path about an axis that extends through the pit perpendicular to the plane of the cut face of the drupe half. This force, plus the pressure or force applied by said tines against the convex side of the pit in a direction outwardly of the pit cavity, will normally be adequate to free the pit from the flesh of the pit cavity when the progressive breaking of the fibers connecting the fibers with the flesh have so weakened the attachment that the aforesaid combined forces are adequate to break the fibers that may remain and those that may be positioned between the terminal ends of the tines. Each of the tines preferably make a complete 360° revolution about the axis of shaft 6 during each pitting operation.

Clingstone peach halves that have been pitted by the apparatus and method described have the desired appearance and characteristics of having been pitted by a torque-type pitter. The flavorsome fibers and flesh adjoining the pit are substantially retained to give the peach halves the improved flavor not present where the pits have been cut from the halves by U-shaped, spoon-type, or other conventional cutting blades.

It may also be noted that the present apparatus and method does not depend upon the drupe halves being oriented other than having their cut faces directed upwardly or having pit exposed for entry of the tines, substantially as described.

The present apparatus is not necessarily intended to replace the torque-type pitters, such as disclosed in U.S. Pat. to Perrelli No. 2,664,127, of Dec. 29, 1953, inasmuch as where substantially all of the cling peaches have developed normally with the pits solid, instead of being split, the torque-type pitter that bisects the flesh of the peaches and at substantially the same time holds the pit and twists the halves therefrom is preferable, but where a relatively high percentage of the peaches have split pits, the use of the present invention overcomes the multiple handling and added labor costs involved in initially passing all of the peaches through a torque pitter of the type above mentioned, and thereafter separating the unpitted halves having split pits therein from those that have been pitted and then pitting the former with the present pitter, by first bisecting all of the peaches and pits by any conventional means, and then pitting the halves by the present invention. Where the percentage of split pits may be small, the present invention may be used to supplement the torque pitter.

While the present invention has the advantage of cleaning out the undesirable meat that many times exists abound the suture portions of split pits, as well as any pit fragments above the tines and along said portions, it is obvious that the present method and pitter may be used to pit bisected halves irrespective of the percentage of split pit halves in total volume of fruit.

Broadly, the method in the present instance, as applied to a clingstone peach having a pit cavity with a pit therein and a planar cut face extending to said pit and cavity, and which pit has a generally convex side adhered by fibers of the fruit to the walls of the pit cavity, comprises the steps of applying a pressure at a point or points within said cavity against the convex side of said pit in a direction outwardly of and generally axially of an axis that is approximately centrally of and perpendicular to said cut face, while holding the body of the bisected drupe around said pit substantially against movement in said direction, and at the same time progressively breaking the fibers connecting said pit with said walls until said pit is free from said walls.

The device, itself, broadly, is a device that includes holding means for holding a bisected clingstone peach body having a planar cut face in the plane bisection of the body, with the pit in the pit cavity of said body and a portion of said cut face adjacent thereto exposed for entry of pit engaging means through said portion of said face into said body through said cut face and to a position into engagement with the side of said pit that is within said pit cavity and spaced from the edges of the pit that are at said cut face. Means is connected with said pit engaging means for so moving the latter into said body to apply a yieldable force of pressure against the convex side within said pit cavity in a direction outwardly of the latter generally axially of said plane and outwardly of said cavity and at the same time moving said pit engaging means in an annular path around said axis to break the fibers connecting the pit to the walls of said cavity until the pit is free for movement out of the cavity. Actually, the pit engaging means are elements that are preferably generally wedge-shaped with the narrow edges leading in said movement about said annular path so as to break the fibers connecting the pit with the pit cavity, rather than to cut them and the fibers connecting the pit with the walls of the cavity are under tension due to the pressure against the pit, so that before all of the fibers are actually broken the pit holding strength of the remaining fibers will be reduced to a point that said remaining fibers will be broken under the influence of said pressure along and the pit will be lifted free from the walls of the pit cavity.

The leading edges of the pit engaging elements may be sharpened along the portions that extend across and that are spaced from the edges of the pit so as to cut away the discolored and impaired flesh that is adjacent to said edges. This impaired and discolored flesh is normally relatively soft and may include weakened fragments of the pit without effective pit-holding fibers.

While the drawings and description show a single pitting head and a single positioner and holder for a drupe half to be pitted, it is obvious that a plurality of such heads and positioners may be combined in a single machine and their movements synchronized to effect simultaneous pitting of a plurality of drupe halves. Also, the pitting head may be supported for movement toward the holder for the drupe half instead of the holder carrying the half to the pitting head, the former being merely the reverse of the latter. FIG. 9 is illustrative of only so much of the printing head as is necessary to show means supporting the head for reciprocatory movement.

We claim:
1. The method of pitting a clingstone peach half having a body with a pit therein, said body having a planar cut face with a pit cavity therein and said pit having a convex side held in said cavity by fibers connecting it with the walls of the latter, comprising the steps of:
   a. tensioning said fibers in a direction generally axially of the axis of said peach half that is perpendicular to the plane of said cut face, and at the same time; and
   b. progressively parting the fibers so tensioned adjacent to said convex side until said pit is separated from the walls of said cavity.

2. In the method as defined in claim 1; said progressive parting of said fibers being in one direction in an annular path about said axis.

3. In the method as defined in claim 2; applying a torque force to said pit relative to said body in said one direction about said axis during said parting of said fibers.

4. In the method as defined in claim 2; said parting of said fibers being under the force of localized added tension applied to said fibers along a line extending generally transversely of the latter and moving in said one direction.

5. In the method as defined in claim 4; removing from said body a portion of the flesh of the latter adjoining the edge of said pit at said cut face, simultaneously with parting said fibers.

6. The method of pitting a clingstone peach half having a body with a pit therein, said body having a planar cut face with a pit cavity therein and said pit having a convex side held in said cavity by fibers connecting it with the walls of the latter, comprising the steps of:
   a. simultaneously applying a force within said cavity against said pit in a direction outwardly of said cavity and generally axially of an axis substantially centrally of and perpendicular to said cut face, and holding said body against movement in said direction, and at the same time; and
   b. progressively parting the fibers connecting said pit and the walls of said cavity until said force overcomes the holding resistance of the unparted fibers and thereafter separating said pit from said body under the influence of said force.

7. In the method as defined in claim 6; said progressive parting of said fibers being along an annular path coaxial with said axis.

8. A pitter for pitting a peach half having a body with a pit therein, said body having a planar cut face with a pit cavity therein and said pit having a convex outer side held in said cavity by fibers connecting it with the walls of said cavity, comprising:
   a. supporting means for supporting such peach half in a position with said pit exposed, and against movement of said body axially of an axis perpendicular to the plane of said cut face in a direction outwardly of said cavity;
   b. an element having a pit engaging surface and means supporting said element in a position for movement thereof through said cut face from outside the latter adjacent to one edge of said pit for moving said pit engaging surface into engagement with the convex surface of said pit within said cavity at a point spaced from said one edge when said peach half is in said position;
   c. means operatively connected with said element for so moving the latter and for moving said element in an annular path within said cavity relative to said pit and about said axis while said element is in said engagement with said pit for parting said fibers connecting said pit with the walls of said cavity;
   d. means for holding the pit engaging surface of said element in engagement with said convex surface of said pit during movement of said element in said path.

9. In a pitter as defined in claim 8; said means for holding said pit-engaging surface in engagement with said pit including yieldable means for applying a force against said convex surface in a direction outwardly of said pit cavity whereby said pit will be moved out of said cavity under the influence of said force when said fibers are parted.

10. In a pitter as defined in claim 8;
    a. said element comprising an elongated tine having one end thereof connected with the means supporting said tine for movement longitudinally thereof through said cut surface and the opposite end of said tine being a free terminal end with said pit engaging surface being a lateral side of said tine;
    b. said means supporting said element being supported for movement about said axis for moving said tine in one direction in said annular path whereby said tine will have a leading edge and a trailing edge during said movement, the tine being generally wedge-shape in cross-sectional contour to provide a relatively narrow lateral edge and a relatively wide edge opposite thereto, and said leading edge being said narrow lateral edge whereby the flesh of said peach half at said convex surface of said pit will be forced outwardly of said pit by movement of said tine in said annular path.

11. A pitter for pitting a peach half having a body with a pit therein, said body having a planar cut face with a pit cavity therein and said pit having a convex outer side held in said cavity by fibers connecting it with the walls of said cavity, comprising:
    a. supporting means for supporting such peach half in a pitting position with said pit exposed, and against movement of said body axially of an axis perpendicular to the plane of said cut face in a direction outwardly of said cavity;
    b. a pair of spaced, opposed elements each having a pit engaging surface, and means supporting said elements in a position for movement thereof through said cut face from outside the latter past opposite edges of the pit and into engagement with the convex surface of said pit within said cavity at points intermediate said edges of said pit, when said peach half is in said pitting position;
    c. element-supporting means supporting said elements for said movement into said engagement with the convex surface of said pit and for movement of said elements relative to said body, in one direction in an annular path about said axis during said engagement with said convex surface for parting said fibers connecting said pit with the walls of said cavity;
    d. means for holding said pit-engaging surfaces of said elements in slidable engagement with said convex surface of said pit during movement of said elements in said path; and
    e. said elements each having a free, slightly convexly rounded leading edge in a cross-sectional contour adjacent to and along said pit-engaging surface whereby said last-mentioned surface will slide over the convex surface of said pit during movement of said elements in said annular paths, and said fibers ahead of each of said edges will be broken.

12. In a pitter as defined in claim 11; said means for holding said pit-engaging surfaces in engagement with said convex outer surface of said pit including yieldable means for applying a force against said convex surfaces in a direction outwardly of said pit cavity, whereby said pit will be moved out of said cavity under the influence of said force when said fibers are parted.

13. A pitter for pitting a peach half having a body with a pit therein, said body having a planar cut face with a pit cavity therein and said pit having a convex outer side held in said cavity by fibers connecting it with the walls of said cavity, comprising:
    a. supporting means for supporting such peach half in a pitting position with said pit exposed, and against movement of said body axially of an axis perpendicular to the plane of said cut face in a direction outwardly of said cavity;
    b. a pair of spaced, opposed elements each having a pit-engaging surface, and means supporting said elements in a position for movement thereof through said cut face from outside the latter past opposite edges of the pit and into engagement with the convex surface of said pit within said cavity at points intermediate said edges of said pit, when said peach half is in said pitting position;
    c. element-supporting means supporting said elements for said movement into said engagement with the convex surface of said pit and for movement of said elements relative to said body, in one direction in an annular path about said axis during said engagement with said convex surface for parting said fibers connecting said pit with the walls of said cavity;

d. means for holding said pit-engaging surfaces of said elements in engagement with said convex surface of said pit during movement of said elements in said path;

e. each of said elements comprising an elongated tine having one end thereof connected with said element-supporting means and in a position for movement of said tines longitudinally thereof past two opposite edges of said pit and to positions with their opposite ends within said body adjacent to said convex surface of said pit, said opposite end of each tine being a free terminal end and said pit-engaging surfaces of said tines being one of the lateral sides of each tine;

f. each of said tines having a leading edge extending longitudinally thereof facing in the direction of movement of said tines in said annular path; and g. the free terminal ends of said tines terminating at points on the convex surface of said pit spaced between said opposite edges of said pit when said tines are in pitting positions within said body.

14. In a pitter as defined in claim 13:

a. said element-supporting means supporting the end portions of said tines adjacent thereto in positions within said body and spaced outwardly of the edges of said pit when said pit-engaging surfaces are in said pit cavity in engagement with the convex outer surface of said pit; and b. said end portions each including a leading edge substantially in continuation of said leading edges of said respective tines for removing the flesh of said body around the edge of said pit upon movement of said tines in said annular path when said tines are in said pitting position.

15. In a pitter as defined in claim 12; said leading edges of said end portions of said tines being relatively sharp for cutting said flesh.

16. In a pitter as defined in claim 13; said pit-engaging surfaces of said tines being slidable longitudinally therein against said convex surface of said pit during movement into said body supporting the terminal end of each tine against engagement with said convex surface of said pit during said longitudinal movement of said tines.

17. A pitter for pitting a peach half having a body with a pit therein, said body having a planar cut face with a pit cavity therein and said pit having a convex outer side held in said cavity by fibers connecting it with the walls of said cavity, comprising:

a. supporting means for supporting such peach half in a pitting position with said pit exposed, and against movement of said body axially of an axis perpendicular to the plane of said cut face in a direction outwardly of said cavity;

b. a pair of spaced, opposed elements each having a pit-engaging surface, and means supporting said elements in a position for movement thereof through said cut face from outside the latter past opposite edges of the pit and into engagement with the convex surface of said pit within said cavity at points intermediate said edges of said pit, when said peach half is in said pitting position;

c. element-supporting means supporting said elements for said movement into said engagement with the convex surface of said pit and for movement of said elements relative to said body, in one direction in an annular path about said axis during said engagement with said convex surface for parting said fibers connecting said pit with the walls of said cavity;

d. means for holding said pit-engaging surfaces of said elements in engagement with said convex surface of said pit during movement of said elements in said path;

e. said element-supporting means supporting said elements for movement toward each other into said body in corresponding arcuate paths disposed in parallel, closely adjacent planes perpendicular to the plane of said cut face; and f. said pit-engaging surfaces being relatively straight and on adjacent sides of said elements for engaging said convex side at different spaced points according to the size of the pit in the half that is in said pitting position.

18. A pitter for pitting a clingstone peach half having a body with a pit therein, said body having a planar cut face with a pit cavity therein and said pit having a convex outer side held in said cavity by fibers connecting it with the walls of said cavity comprising:

a. supporting means for supporting such peach half in a pitting position with said pit exposed, and against movement of said body axially of an axis perpendicular to the plane of said cut face in a direction outwardly of said cavity;

b. a pair of spaced, opposed elements each having a pit-engaging surface, and means supporting said elements in a position for movement thereof through said cut face from outside the latter past opposite edges of the pit in a direction generally outwardly of said pit cavity into engagement with the convex surface of said pit within said cavity at points spaced between said edges of said pit, and free from engagement with said last-mentioned edges, when said peach half is in said pitting position;

c. element-supporting means supporting said elements for said movement into said engagement with said convex surface of said pit and for movement of said elements and said body relatively about said axis during said engagement with said convex surface for parting said fibers connecting said pit with the walls of said cavity;

d. means for yieldably holding said pit-engaging surfaces of said elements in engagement with said convex surface of said pit at said points and for yieldably urging said elements in said direction generally outwardly of said pit cavity during movement of said elements and body relatively in a direction about said axis; and e. means connected with said elements for effecting said relative movement between said body and said elements during said engagement between said elements and said pit.

19. In a pitter for pitting a peach half having a body with a pit therein, said body having a planar cut face with a pit cavity therein, said pit having a convex outer side held in said cavity by fibers connecting it with the walls of said cavity:

a. supporting means against which said cut face is adapted to be seated;

b. pit-engaging means positioned adjacent to said supporting means supported for movement relative to said supporting means into the body of said half when the cut face of the latter is against said supporting means and into slidable engagement with said convex side of said pit in a direction for imparting a component of force against said pit in a direction outwardly of said cavity during said movement into said body, and means connected with said pit-engaging means for so moving the latter;

c. said pit being free for movement out of said pit cavity under the influence of said force during parting of said fibers and means for moving said pit-engaging means, and said body with said pit therein, one relative to the other, about the axis of said body that is perpendicular to the plane of said cut face for parting said fibers by said pit-engaging means during said application of said force by the latter against said pit, whereby said pit will be moved out of said pit cavity under the influence of said force.